S. W. GRIFFIN.
VARIABLE SPEED MECHANISM.
APPLICATION FILED MAY 1, 1920.
1,420,253.
Patented June 20, 1922.
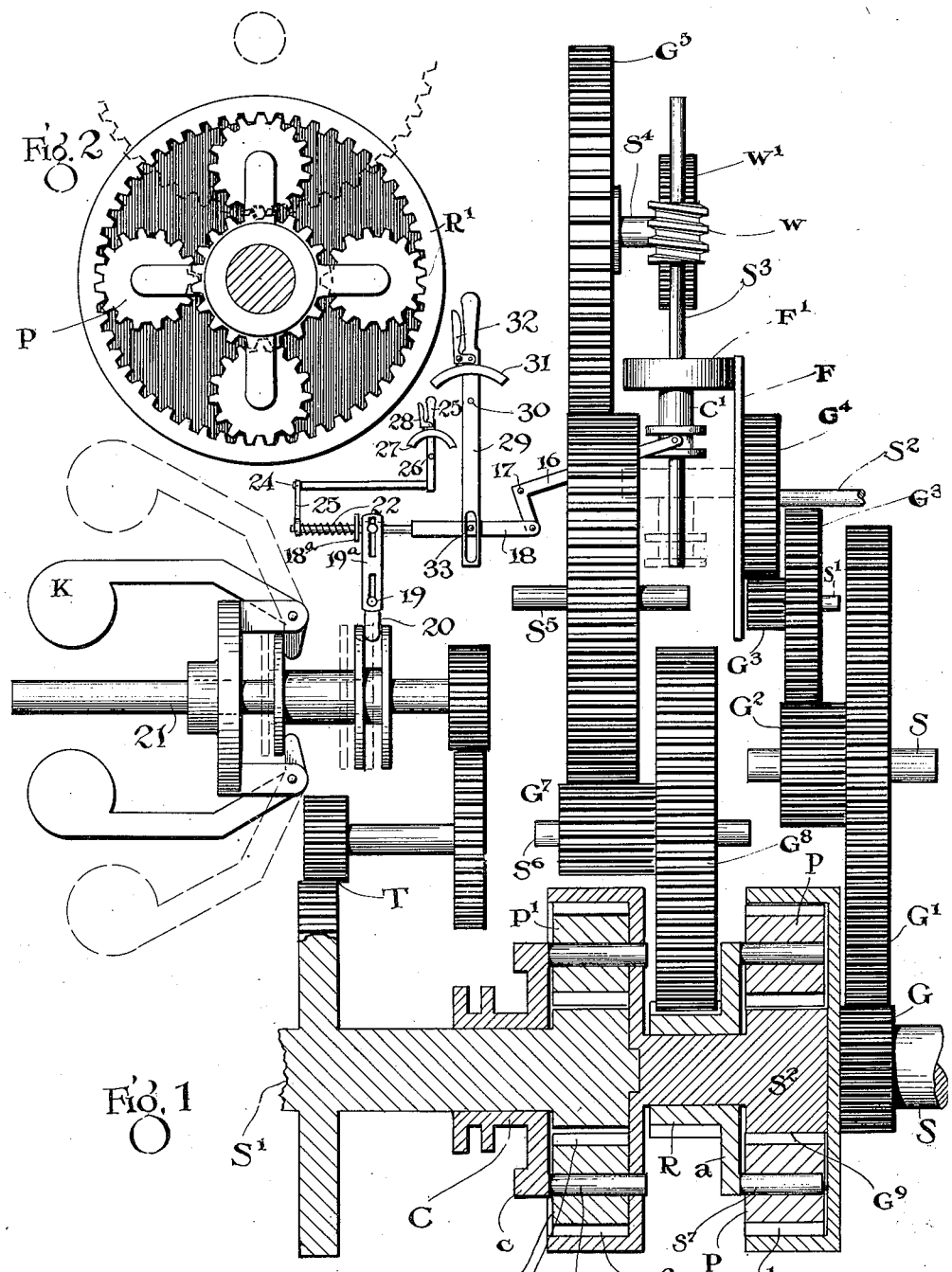
INVENTOR
Stephen W. Griffin.

UNITED STATES PATENT OFFICE.

STEPHEN WILLIAM GRIFFIN, OF WATERLOO, ILLINOIS.

VARIABLE-SPEED MECHANISM.

1,420,253.  Specification of Letters Patent.  Patented June 20, 1922.

Application filed May 1, 1920. Serial No. 378,253.

*To all whom it may concern:*

Be it known that I, STEPHEN WILLIAM GRIFFIN, a citizen of the United States, and a resident of Waterloo, in the county of Monroe and State of Illinois, have invented certain new and useful Improvements in Variable-Speed Mechanism, of which the following is a specification.

My invention relates to variable speed mechanism particularly adapted to self-propelled vehicles.

A purpose of my invention is the provision of a variable speed mechanism in which the speed of such mechanism is automatically varied in accordance with the speed of the vehicle and the load of the engine, at the same time maintaining the rotational speed of the engine practically constant.

It is also a purpose of my invention to provide a variable speed mechanism including toothed gears which constantly mesh with each other, and frictional gears automatically controllable by a centrifuge to vary the speed of the driven shaft but so associated with the toothed gears as not to actually constitute a part of the driving mechanism between the driving and driven shafts.

I will describe one form of variable speed mechanism embodying my invention and will then point out the novel features thereof in claims.

In the accompanying drawings:

Figure 1 is a view partly diagrammatically showing in side elevation and in section one form of variable speed mechanism embodying my invention.

Figure 2 is a vertical sectional view taken on the line 2—2 of Figure 1.

Similar reference characters refer to similar parts in each of the views.

Referring specifically to the drawings and particularly to Figure 1, S designates a driving shaft which in the practical application of the mechanism to a motor vehicle is adapted to be directly connected to the crank shaft of the engine through a foot actuated clutch (not shown). S' designates a driven shaft which is adapted to be operatively connected to the driving axle of a motor vehicle in the usual manner. Between the driving and driven shafts, the variable speed mechanism embodying my invention is interposed, such mechanism in the present instance comprising a gear G fixed to the driving shaft S and meshing with a relatively large gear G' fixed to a stub shaft $s$. Fixed to the same shaft $s$ is a smaller gear $G^2$, which meshes with a gear $G^3$ fixed to a stub shaft $s'$. The shaft $s'$ in turn is operatively connected to a shaft $s^2$ through the medium of gears $G^3$ and $G^4$ fixed to the shafts $s'$ and $s^2$, respectively. Secured to one side of the gear $G^4$ is a friction gear F that contacts with another friction gear F' fixed to a shaft $s^3$. The gear F is of the disc type while the gear F' is of the wheel type and is provided with a squared bore which fits on a squared portion of the shaft $s^3$ so that it will rotate with the shaft while at the same time being capable of longitudinal movement thereupon to occupy various contacting positions between the axis and the periphery of the gear F and thereby vary the speed at which it is driven by the gear F. The shaft $s^3$ is operatively connected to a right angularly disposed shaft $s^4$ by a worm W which meshes with a worm gear W' fixed to the shaft $s^4$. The shaft $s^4$ also carries a gear $G^5$ which meshes with a gear $G^6$ fixed to a shaft $s^5$. The latter gear $G^6$ is operatively connected to a shaft $s^6$ by a relatively small gear $G^7$, and fixed to the shaft $s^6$ is another gear $G^8$ which drives a ring gear R rotatably supported upon an intermediate shaft $S^2$. As shown, the intermediate shaft $S^2$ is interposed between the confronting ends of the driving and driven shafts S and S' and is adapted to be operatively connected to the same by the following mechanism: Secured to the rear end of the driving shaft S is an internal ring gear R' which as shown to advantage in Figure 2 constantly meshes with a plurality of planetary gears P journaled upon stub-axles $s^7$ fixed in arms $a$ formed integral with and extending laterally from the ring gear R. The planetary pinions P are four in number in the present instance and as shown in both Figures 1 and 2 constantly mesh with a gear $G^9$ formed on the forward end of the intermediate shaft $S^2$. The rear end of the intermediate shaft $S^2$ is provided with an internal ring gear $R^2$ which is identical in construction to the gear R with the exception that the vertical wall thereof is formed with openings in which are slidably fitted the forward ends of stub-axles $s^8$ carried by the flange $c$ of a collar C. Journaled upon the stub-axles $s^8$ are planetary pinions P' which constantly mesh with the teeth of the gear R² and with a gear $G^{10}$ formed on the forward end of the driven shaft S'.

As shown in Figure 1, the friction wheel F' is provided with a grooved collar C' in which is loosely mounted a pin 15. The pin 15 in turn works within the slotted end of a bell crank lever 16 fulcrumed as at 17 and pivotally connected to a rod 18. The rod 18 is in turn pivotally connected to an arm $19^a$ and the latter is pivotally connected to an arm 19 mounted in the groove of a collar 20 slidably mounted upon a shaft 21. The shaft 21 carries a centrifuge of standard construction designated generally at K which is adapted to move the collar 20 forwardly or rearwardly upon the shaft 21 to effect the lateral shifting of the friction wheel W through the intermediate mechanism just described. The shaft 21 is driven by the driven shaft S' in any suitable manner such as by the train of gearing shown and designated generally at T.

The operation of the mechanism thus far described is as follows: With the driving shaft S rotating, it will be clear that through the intermediate gearing G, G', etc., a driving of the friction gear F is effected which in turn rotates the shaft $s^3$ at a speed depending upon the position of the friction wheel F' with respect to the disc F. For example, with the wheel F' in the position shown in Figure 1, the disc F rotates the same at a relatively high speed. However, when the wheel F' is moved toward the axis of the disc F, the speed of rotation of the wheel is accordingly decreased. With the rotation of the shaft $s^3$, the worm W and the worm gear W' effect the driving of the gear $G^5$ which latter in turn effects a driving of the ring gear R through the intermediate gearing, as will be understood. Driving of the ring gear R causes a bodily rotation of the several planetary pinions P. However, because of the fact that the pinions P constantly mesh with the gear R' and the gear $G^9$, and the former is being rotated by the driving shaft S, it will be seen that a driving of the intermediate shaft S² is effected through the ring gear R' at a speed in reverse proportion to the speed of rotation of the ring gear R. Thus, by increasing the rotational speed of the gear R, the speed at which the shaft S² is driven is decreased, and conversely when the rotational speed of the gear R is decreased, the rotational speed of the shaft S² is increased. The intermediate shaft S² in turn effects a driving of the driven shaft S' through the ring gear R² and the planetary pinions P'. When the stub-axles $s^8$ are within the openings of the gear R² as shown in Figure 1, a direct driving connection between the intermediate shaft S² and the driven shaft S' is effected, it being understood that the pinions P' rotate bodily about the shaft S' as a center. However, when the stub-axles $s^8$ are withdrawn from the openings of the gear R², the pinions P' are free to rotate about their own axes which as a result causes a driving of the shaft S' in a reverse direction. The actuation of the stub-axles $s^8$ is effected through suitable levers (not shown) which may be connected with the collar C for effecting a longitudinal movement of the same upon the shaft S'.

With the driven shaft S' rotating in one direction or the other, a driving of the centrifuge K is effected through the intermediate train of gearing T. The normal position of the centrifuge is as shown in solid lines in Figure 1 wherein it will be seen that the disc wheel F' contacts with the marginal edge of the disc F thereby effecting a rotation of the ring gear R at the highest speed of which it is capable. However, as the speed of the driven shaft S' increases, the weights of the centrifuge are thrown outwardly thus causing a movement of the disc wheel F' inwardly toward the axis of the disc F to thereby effect the decrease in the rotational speed of the ring gear R which latter in turn increases the rotational speed of the intermediate shaft S², as will be more clearly described hereinafter.

To limit the action of the centrifuge K and thereby control the movement of the disc wheel F', I provide means for limiting the movement of the arm 19 to the left as when viewed in Figure 1. In the present instance, this means comprises the rod 18 which has one end slidably fitted in a suitable bearing $18^a$ and about which is coiled a spring 22, the forward end of which latter abuts one arm of a bell crank lever 23 that is slidably fitted upon the rod. The bell crank lever 23 is fulcrumed as at 24, its other arm being pivotally connected to an actuating lever 25 fulcrumed as at 26 upon a quadrant 27 and capable of being locked in any adjusted position with respect to the quadrant by a pawl 28. By this arrangement it will be seen that with the lever 25 in its normal vertical position, the bell crank lever 23 will be ineffective to restrict the movement of the arm 19 to the left. However, when the lever is manually rocked to the left, a rearward movement of the bell crank lever 23 against the tension of the spring 22 is effected thereby compressing the spring and thus restricting the movement of the arm 19 in the direction of the spring. When the lever 25 is moved in the opposite direction, the bell crank lever 23 allows the spring 22 to expand, which action permits of the unrestricted movement of the arm 19.

Should the centrifuge K fail to function for any reason, the disc wheel F' can be manually actuated through the medium of a lever 29 fulcrumed as at 30 upon a quadrant 31 and adapted to be locked in adjusted position upon the quadrant by a pawl 32. The lower end of the lever 29 is connected to the link 18 by a spring and slot connection designated at 33, thus when the lever is moved in one direction or the other about the pivot 30, the link 18 is moved longitudinally in one direction or the other to cause a longitudinal movement of the disc wheel F' in either direction along the shaft $s^3$.

In the practical application of the variable speed mechanism to a motor vehicle, it operates in the following manner: With the driving shaft S connected to the engine of a motor vehicle and parts of the speed mechanism in the position shown in Figure 1, a driving of the ring gear R is effected at the highest speed of which it is capable thereby rotating the planetary pinions P at a corresponding speed which obviously causes a driving of the actuating shaft $S^2$ by the gear R' at a relatively low speed. The driving of the shaft $S^2$ in turn effects the driving of the driven shaft S' as has been described, and as the speed of the shaft S' increases, the centrifuge K gradually moves the friction wheel F' inwardly toward the axis of the disc F thus decreasing the speed of the ring gear R and thereby automatically increasing the rotational speed of the shaft $S^2$. This in turn increases the speed of the driven shaft S', and when the friction wheel F' occupies the position adjacent to the axis of the disc F, the driven shaft will be rotated at its highest speed. It will thus be seen that a gradual and automatic increase in the speed of the driven shaft is effected through the medium of the centrifuge K.

When the speed of the driven shaft falls owing to a hill being encountered or the load of the vehicle increasing, or some other reason, the centrifuge moves the friction wheel toward its normal position at the periphery of the disc F thus causing a driving of the shaft S' at a lower speed. In traffic or where it is necessary to reduce the speed of the car intentionally, the lever 25 is moved to the right which allows of a greater freedom of movement of the arm 19 so that the friction wheel F' is more sensitive to the action of the centrifuge K. When it is desired to increase the speed of the car, the lever 25 is moved to the left thus restricting the movement of the arm 19 and thereby rendering the wheel F' less sensitive to the action of the centrifuge K. To effect a reverse driving, the collar C is moved to the left so as to withdraw the stub axle $s^8$ from the gear $R^2$ in the manner previously described.

From the foregoing operation, it will be clear that the centrifuge K in addition to automatically controlling the speed of the driven shaft S' also serves to maintain the rotational speed of the engine constant thus producing a speed changing mechanism of great efficiency.

Although I have herein shown and described only one form of variable speed mechanism embodying my invention, it is to be understood that various changes and modifications may be made herein without departing from the spirit of the invention and the spirit and scope of the appended claims.

What I claim is:

1. A variable speed mechanism comprising a driving shaft, a second shaft, a gear loosely mounted on the second shaft, means operable by the driving shaft for driving said gear, means operable by said gear for operatively connecting the driving shaft and the second shaft in such manner that a driving of the second shaft is effected at a speed in inverse proportion to the rotational speed of the gear, the last means including a friction gear and a friction wheel movable on the surface of the gear, a centrifuge adapted to be driven by the second shaft, and means operatively connecting the centrifuge and the friction wheel to vary the position of the latter with respect to the friction gear.

2. A variable speed mechanism comprising a driving shaft, a second shaft, a gear loosely mounted on the second shaft, means operable by the driving shaft for driving said gear, means operable by said gear for operatively connecting the driving shaft and the second shaft in such manner that a driving of the second shaft is effected at a speed in reverse proportion to the rotational speed of the gear, the last means including a friction gear and a friction wheel movable on the surface of the gear, a centrifuge adapted to be driven by the second shaft, and means operatively connecting the centrifuge and friction wheel to vary the position of the latter with respect to the friction gear comprising an arm for controlling the centrifuge, means for urging the arm to a predetermined position, manually operable means for controlling the last means to vary the predetermined position of the arm, and manually operable means for actuating the friction wheel independently of the centrifuge.

STEPHEN WILLIAM GRIFFIN.